(12) United States Patent
Beidenhauser

(10) Patent No.: US 10,451,477 B2
(45) Date of Patent: Oct. 22, 2019

(54) MONITORING APPARATUS FOR A LASER BEAM

(71) Applicant: MBDA Deutschland GmbH, Schrobenhausen (DE)

(72) Inventor: Georg Beidenhauser, Bergheim (DE)

(73) Assignee: MBDA Deutschland GmbH, Schrobenhausen (DE)

( * ) Notice: Subject to any disclaimer, the term of this patent is extended or adjusted under 35 U.S.C. 154(b) by 147 days.

(21) Appl. No.: 14/941,175

(22) Filed: Nov. 13, 2015

(65) Prior Publication Data

US 2016/0138971 A1 May 19, 2016

(30) Foreign Application Priority Data

Nov. 15, 2014 (DE) .................. 10 2014 016 889

(51) Int. Cl.
*H01S 3/00* (2006.01)
*G01J 1/42* (2006.01)
*G01J 1/04* (2006.01)

(52) U.S. Cl.
CPC ........... *G01J 1/4257* (2013.01); *G01J 1/0425* (2013.01); *H01S 3/0014* (2013.01)

(58) Field of Classification Search
CPC .......... G01J 1/04; G01J 1/4257; H01S 3/0014
USPC .................. 250/206, 221; 372/29.01, 29.014
See application file for complete search history.

(56) References Cited

U.S. PATENT DOCUMENTS

| | | | |
|---|---|---|---|
| 4,311,142 A | 1/1982 | Machida | |
| 4,792,690 A | 12/1988 | McCann et al. | |
| 4,793,715 A | 12/1988 | Kasner et al. | |
| 5,442,154 A | 8/1995 | Philippe et al. | |
| 6,516,016 B1 * | 2/2003 | Fukunaga | H01S 5/2231 372/45.01 |
| 2002/0108939 A1 | 8/2002 | Mayer | |
| 2010/0245830 A1 | 9/2010 | Ito et al. | |

FOREIGN PATENT DOCUMENTS

| | | |
|---|---|---|
| DE | 36 38 874 A1 | 5/1987 |
| DE | 10 2009 040 661 A1 | 3/2011 |
| EP | 2 145 720 A1 | 1/2010 |
| EP | 2 338 635 A1 | 6/2011 |
| JP | 61-88992 A | 5/1986 |
| JP | 10-10342 A | 1/1998 |
| JP | 2013-212510 A | 10/2013 |
| WO | WO 2012/071033 A1 | 5/2012 |

OTHER PUBLICATIONS

European Search Report issued in European counterpart application No. EP 15 00 3130 dated Apr. 18, 2016, with Statement of Relevancy (Two (2) pages).
Singapore Search Report issued in Singapore counterpart application No. 10201509229W dated Jun. 11, 2018 (Two (2) pages).
German Office Action issued in German counterpart application No. 10 2014 016 889.1 dated Feb. 10, 2016 (Seven (7) pages).
European Search Report issued in European counterpart application No. 15 003 130.0 dated Jul. 18, 2016, with Statement of Relevancy (Twelve (12) pages).

* cited by examiner

Primary Examiner — Kevin Pyo
(74) Attorney, Agent, or Firm — Crowell & Moring LLP

(57) ABSTRACT

The present invention relates to a monitoring apparatus for a laser beam, including a body having a passage opening and a sensor that is disposed on the body, wherein impact of the laser beam onto the body can be detected using the sensor.

22 Claims, 4 Drawing Sheets

MONITORING APPARATUS FOR A LASER BEAM

CROSS REFERENCE TO RELATED APPLICATIONS

This application claims priority under 35 U.S.C. § 119 from German Patent Application No. 10 2014 016 889.1, filed Nov. 15, 2014, the entire disclosure of which is herein expressly incorporated by reference.

BACKGROUND AND SUMMARY OF THE INVENTION

The present invention relates to a monitoring apparatus for a laser beam. Furthermore, the invention relates to a laser apparatus for emitting laser light, which apparatus comprises a monitoring apparatus. Finally, the invention relates to a method for monitoring a laser beam.

Technical systems in which laser radiation is used require that this laser beam propagates on a previously established path. If the beam departs from this previously established path, for example in the event of an error, functional failure of the system and/or damage to the system can occur. This can happen as the result of both direct and indirect, i.e. reflected laser radiation. For this reason, it is necessary to check whether or not the laser beam is situated on the previously established path.

From the state of the art, light-sensitive sensors are known, with which sensors it is possible to check whether the laser beam is situated on the previously established path, if the number and arrangement of the sensors is appropriate. Depending on the geometry of the space to be monitored, very many sensors can be required for this purpose, because every sensor has only a limited detection range. It is therefore necessary to place multiple sensors so that their vision ranges supplement one another in such a manner that in total, the entire space to be monitored can be observed. Aside from the plurality of sensors, overlaps of the vision ranges are necessarily accepted in this regard, without achieving real redundancy to reduce the failure probability of the system.

One object of the invention is to make available a monitoring apparatus for a laser beam, which apparatus allows secure and reliable monitoring of a laser beam, along with simple and cost-advantageous production.

This object may be accomplished by a monitoring apparatus for a laser beam, which apparatus comprises a body and a sensor. The body has a passage opening, wherein it is provided, in particular, that the laser beam can be passed through this passage opening. The sensor is disposed on the body. According to the invention, it is provided that impact of the laser beam onto the body can be detected by the sensor. In this manner, monitoring of the laser beam can be implemented in such a manner that during normal operation, the laser beam is passed through the passage opening. If, instead, the laser beam is deflected and impacts the body, this is recognized by the sensor. Thereby an error case can be recognized. In this regard, the passage opening can have any desired shape.

The dependent claims have further advantageous developments of the invention as their content.

Preferably, it is provided that the body is a hollow profile having a closed cross-section. In this regard, the hollow profile can assume any desired geometrical shapes. Particularly advantageously, the hollow profile is a light guide. The use of a hollow profile as the body allows reduction of the monitoring region of the laser beam to a two-dimensional plane. Thus, the hollow profile forms a closed geometrical figure in the two-dimensional plane, wherein it is provided that the laser beam impacts this two-dimensional plane perpendicularly during normal operation. Thus the laser beam is represented by a point in the two-dimensional plane. Monitoring is therefore restricted to determining whether the point lies within the geometrical body or impacts the geometrical body. Therefore, monitoring is very simple, particularly in view of the monitoring of an entire three-dimensional space by means of a plurality of light-sensitive sensors used in the state of the art.

It is advantageous if the hollow profile has a mantle surface, wherein the sensor is disposed on the mantle surface. In this regard, it is particularly provided that the sensor is a light-sensitive sensor that recognizes coupling of light of the laser beam into the hollow profile. Therefore the sensor is able to detect when the laser beam impacts the hollow profile. For this purpose, at least one light having the wavelength of the laser beam can be recognized using the sensor.

Likewise, it is preferably provided that the hollow profile has a first face surface and a second face surface, wherein the second face surface has a greater roughness than the first face surface. Due to the different surface roughnesses, which are particularly selected by taking the index of refraction of the material of the hollow profile into consideration, the laser beam can be coupled into the hollow profile. Thereby the laser beam is always guided onto a predefined surface area of the hollow profile, independent of its angle of incidence into the body. Because it is particularly provided that the sensor is disposed on the mantle surface of the hollow profile, the laser beam is advantageously guided onto this mantle surface. Thereby it is particularly possible that the body has any desired shape, because the laser beam can always be guided onto a predefined surface area of the hollow profile.

It is advantageous if the hollow profile is produced from a light-conducting material, preferably from acrylic glass. This allows simple and cost-advantageous production of the hollow profile, wherein at the same time, working of surface roughnesses of the hollow profile is made possible. In particular, acrylic glass is optimally suitable for coupling in light of the laser beam.

Alternatively, the body is an electrical conductor. In this regard, the electrical conductor is advantageously formed into at least one winding. The sensor in turn is configured for measuring a resistance of the electrical conductor. At high laser power, coupling of laser light into the body might no longer be possible, because the intensity of the laser beam would destroy or damage the body. Therefore the body is preferably an electrical conductor that is damaged or severed when the laser beam hits it. In turn, by forming the electrical conductor into at least one winding, the principle described above is achieved, that a closed two-dimensional shape is present, wherein the laser beam intersects the two-dimensional shape at a right angle under normal conditions. If an error case is present, the laser beam impacts the electrical conductor, thereby damaging it. The resistance of the conductor is thereby changed, so that the sensor can detect, by measuring the electrical resistance of the conductor, whether the latter is damaged or destroyed. Once again, it can be recognized, in this manner, whether the laser beam has hit the body. Detection of the electrical resistance can take place either by measuring the resistance or by emitting a test signal, wherein in the latter case, a measure of the resistance can be determined using the test signal that is received after it has passed through the electrical conductor.

It is particularly advantageous if the electrical conductor is structured in a circular shape, so that a round passage opening is present. This simplifies the production and installation of the body configured as an electrical conductor.

Likewise, it is preferably provided that the body is a light wave guide. Particularly advantageously, the light wave guide comprises at least one glass fiber. In this regard, the light wave guide is formed into at least one winding. The sensor in turn is configured for receiving a message transmitted into the light wave guide. In this regard, the monitoring principle is analogous to the case of the electrical conductor. In normal operation, the laser beam is guided perpendicular to a cross-section of the winding, so that it runs through the passage opening formed by the winding. If the laser beam is deflected, however, it impacts the light wave guide and damages or destroys it. Therefore the sensor cannot receive a message transmitted into the light wave guide, or cannot receive it correctly. It is particularly advantageous if the sensor is also configured for emitting the message into the light wave guide, wherein the sensor transmits a message into the light wave guide periodically, in particular. If this message is not received or not received correctly, a conclusion can be drawn concerning damage to the light wave guide and therefore concerning an error case in the operation of the laser beam. The advantage of using the light wave guide particularly lies in the fact that the monitoring apparatus cannot be influenced by external electromagnetic radiation. Likewise, the monitoring apparatus itself does not emit any electromagnetic radiation. Therefore the monitoring apparatus is very robust against interference and can be used even in environments that are not allowed to be disrupted by electromechanical radiation.

The invention furthermore comprises a laser apparatus that comprises a laser source and a previously mentioned monitoring apparatus. In this regard, it is provided that the laser source is configured in such a manner that the laser beam is emitted through the passage opening of the body of the monitoring apparatus. In particular, the body has a closed cross-section, wherein the laser beam is emitted by the laser source in such a manner that the laser beam intersects the cross-section perpendicularly. The laser apparatus can therefore be operated in particularly secure and reliable manner, because an error case can be detected by the monitoring apparatus. At the same time, the laser apparatus can be produced in very simple and cost-advantageous manner, because the monitoring apparatus, in particular, is structured in simple and cost-advantageous manner.

Finally, the invention relates to a method for monitoring a laser beam. The method comprises the following steps: First, a laser beam is emitted by a laser source. In this regard, the laser beam is guided through a passage opening of a body. In particular, propagation of the laser beam takes place concentrically to a center axis of the passage opening. Subsequently, recognition of coupling of the emitted laser beam into the body takes place. Alternatively or in addition to this, recognition of damage to the body by the emitted laser beam takes place. The two stated steps of recognition can be carried out alternatively or simultaneously. In every case, a deviation of a propagation direction of the laser beam can be recognized, because the beam is no longer guided through the passage opening but rather onto the body. Thereby it can be recognized that an error case exists in the emission of the laser beam.

The invention will now be described in detail, using exemplary embodiments, making reference to the attached drawings.

DESCRIPTION OF PREFERRED EMBODIMENTS

Figure 1:
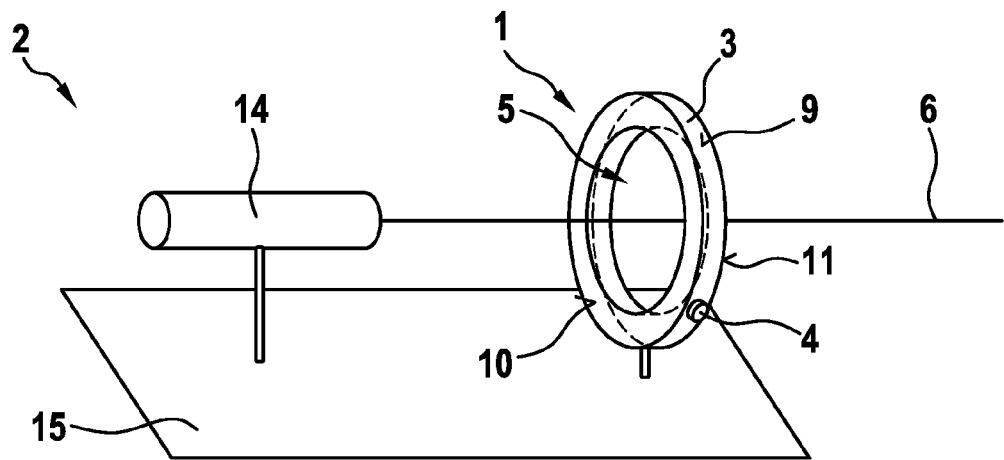
FIG. 1 is a schematic representation of a laser apparatus having a monitoring apparatus according to a first exemplary embodiment of the invention.

FIG. 1 schematically shows a laser apparatus 2 that comprises a laser source 14 and a monitoring apparatus 1. In this regard, the monitoring apparatus 1 has a ring-shaped hollow profile 3 that is produced from acrylic glass. The laser source 14 and the monitoring apparatus 1 are mounted on a base plate 15 in such a manner that the laser source 14 emits a laser beam 6 through a passage opening 5 of the hollow profile 3 of the monitoring apparatus 1. In this regard, an error case can be recognized by the monitoring apparatus 1, wherein an error case is present if the laser beam 6 is not guided through the passage opening 5 of the hollow profile 3, but rather impacts the hollow profile 3, in particular. If the laser beam 6 impacts the hollow profile 3, it is provided that the laser beam 6 is coupled into the hollow profile 3. For this purpose, the hollow profile 3 has a first face surface 10 and a second face surface 11. The first face surface 10 faces the laser source 14. Furthermore, it is provided that the second face surface 11 has a greater surface roughness than the first face surface 10.

Furthermore, the hollow profile 3 has a mantle surface 9. A sensor 4 is mounted on this mantle surface 9, wherein light having the same wavelength as that of the laser beam 6 can be detected using the sensor 4. If the laser beam 6 runs through the passage opening 5 of the hollow profile 3, no light can be detected using the sensor 4.

Figure 2:
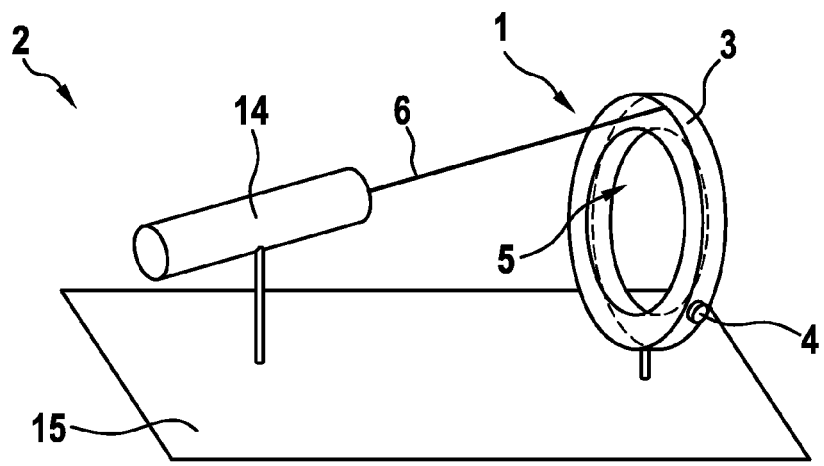
FIG. 2 is a further schematic representation of the laser apparatus having the monitoring apparatus according to the first exemplary embodiment of the invention.

If the laser source 14 is deflected or the laser beam 6 is diverted, the laser beam 6 impacts the hollow profile 3 and is no longer guided through the passage opening 5. This case is shown in FIG. 2. In this regard, FIG. 2 shows the same structure as in FIG. 1, wherein the laser source 14 merely emits the laser beam 6 in a different direction.

As soon as the laser beam 6 impacts the hollow profile 3, the laser beam 6 is coupled into the hollow profile 3. Due to the different surface roughnesses between the first face surface 10 and the second face surface 11, coupling in takes place independent of an angle of incidence and a location at which the laser beam 6 impacts the hollow profile 3, which is configured as a light guide. By means of the hollow profile 3, the coupled-in light of the laser beam 6 is guided onto the mantle surface 9 of the hollow profile 3. In this regard, it is provided that the mantle surface 9 has a uniform surface roughness, so that the light of the laser beam 6 is distributed uniformly on the mantle surface 9. Thereby the light of the coupled-in laser beam 6 can be detected by the sensor 4 at any desired location of the mantle surface 9. As a result, the sensor 4 can be placed at any desired location on the mantle surface 9. It can therefore be determined that the laser beam 6 is no longer guided through the passage opening 5 of the hollow profile 3, so that an error case was recognized.

Because the coupled-in light of the laser beam 6 is visible on the entire mantle surface 9 of the hollow profile 3, it is particularly not prescribed where the sensor 4 must be affixed. It is merely provided that the sensor 4 is disposed at any desired location of the mantle surface 9. Likewise, a shape of the mantle surface 9 is not prescribed, as long as it does not have any jumps or edges, causing routing of the light to be interrupted. Therefore the two-dimensional cross-section of the hollow profile 3, in particular, can also be selected in any desired manner. An example of such optional selectability is shown in FIG. 3.

Figure 3:
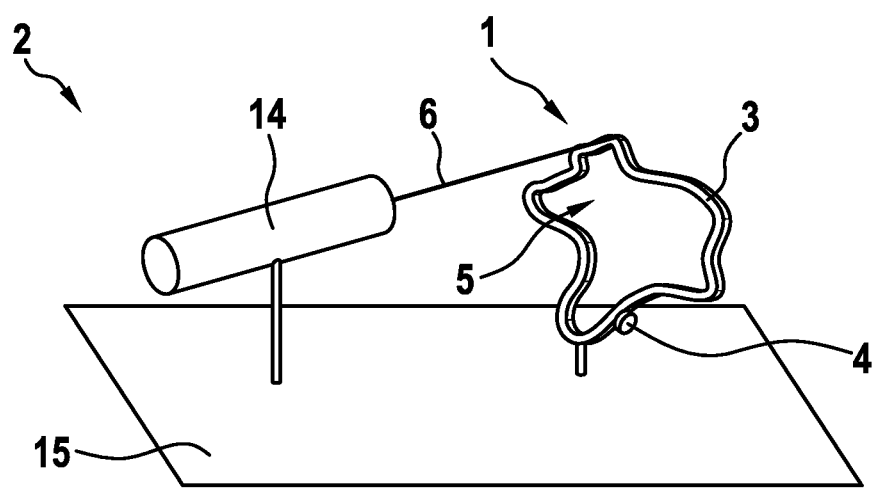
FIG. 3 is a schematic representation of the laser apparatus having an alternative monitoring apparatus according to the first exemplary embodiment of the invention.

FIG. 3 shows the same representation as FIG. 2, wherein merely the shape of the hollow profile 3 was changed. It is therefore evident that the hollow profile 3 can be structured very flexibly and thereby can be optimally adapted to external conditions. In this regard, no symmetries of the hollow profile 3 are required, in particular; the hollow profile 3 merely has to have a closed cross-section. Thereby a maximal monitoring range is implemented with minimal effort. The size and shape of the passage opening 5 are defined by the requirements regarding maximal permissible beam deviation. The smaller this deviation is allowed to be, or the more precisely the laser beam 6 must follow the predetermined path, the smaller the passage opening 5 must be. If the permissible deviation is the same in all directions, the passage opening 5 proves to be a circular passage opening.

In the first exemplary embodiment, recognition of an error case takes place by means of coupling light of the laser beam 6 into the hollow profile 3. If, however, an optical power of the laser beam 6 is too great for coupling light in, then the laser beam 6 can damage the hollow profile 3 or destroy it, depending on the material used and the laser power used. In this case, the first exemplary embodiment cannot be advantageously used. For this purpose, a second and third exemplary embodiment are presented, which can be advantageously used even at very high power of the laser beam 6.

Figure 4:
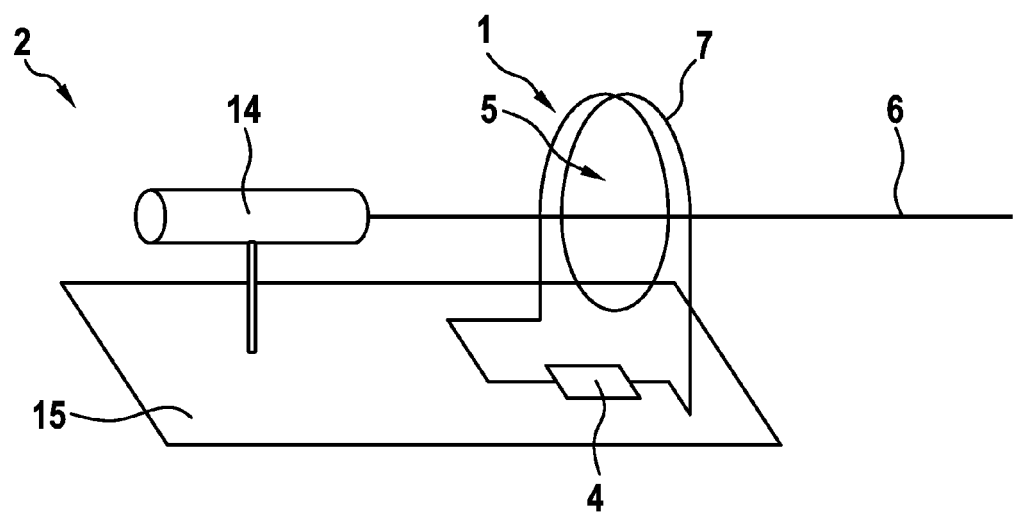
FIG. 4 is a schematic representation of a laser apparatus having a monitoring apparatus according to a second exemplary embodiment of the invention.

FIG. 4 shows a laser apparatus 2 that has a laser source 14 and a monitoring apparatus 1 according to a second exemplary embodiment of the invention. Once again, laser source 14 and monitoring apparatus 1 are mounted on a base plate 15. The monitoring apparatus 1 comprises an electrical conductor 7 that is formed into at least one winding. Thereby the winding forms a passage opening 5. The laser source 14 is set up for transmitting a laser beam 6 perpendicularly through the passage opening 5 of the winding of the electrical conductor 7. The sensor 4 is configured for determining an electrical resistance of the electrical conductor 7. For this purpose, the sensor 4 is either configured for measuring an electrical resistance of the body 7, or for determining the resistance indirectly by means of an emitted test signal.

If the electrical resistance of the electrical conductor 7 is determined by emitting a test signal, it is particularly provided that the resistance is merely determined in binary manner. In this regard, a distinction is made between a closed circuit and an interrupted circuit. This means that a closed circuit is assumed as long as an emitted test signal can be received. If this test signal is not received, however, then an interrupted circuit and thereby damage of the electrical conductor 7 must be assumed.

Figure 5:
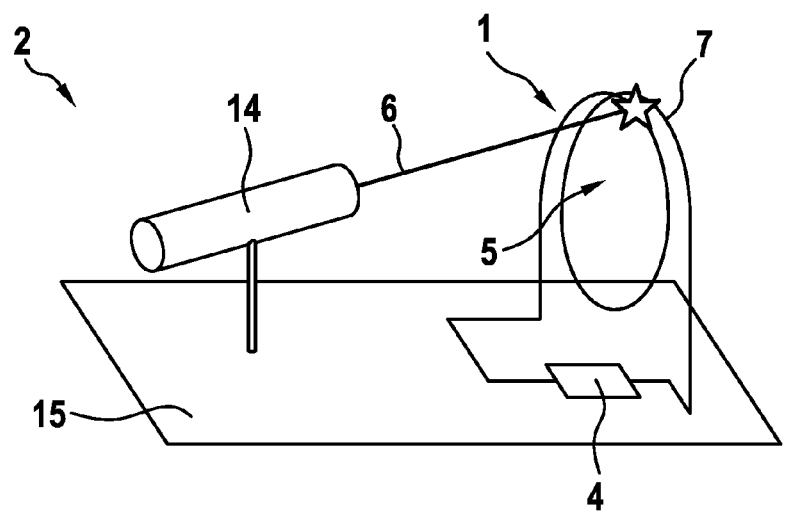
FIG. 5 is a further schematic representation of the laser apparatus having the monitoring apparatus according to the second exemplary embodiment.

If the laser beam 6 is not passed through the passage opening 5 of the electrical conductor 7, as in a normal case, but rather the laser beam 6 impacts the electrical conductor 7, then the laser beam 6 will sever the electrical conductor 7. This is shown in FIG. 5. Thereby the electrical resistance of the electrical conductor 7 increases, and this can be recognized by the sensor 4.

In order to guarantee secure and reliable severing of the electrical conductor 7 by the laser beam 6, a thickness of the electrical conductor 7 is coordinated with the intensity of the laser source 14 and/or of the laser beam 6. Thereby it is ensured that when the laser beam 6 impacts the electrical conductor 7, secure and reliable severing of the electrical conductor 7 takes place.

The electrical conductor 7 is structured to be approximately circular in the second exemplary embodiment. Because the shape of the electrical conductor 7 does not influence its electrical resistance value, it is alternatively provided that the electrical conductor 7 is structured in any desired shape, as long as a two-dimensional projection of the electrical conductor 7 yields a closed cross-section. Here, too, it particularly holds true that the permissible deviation of the laser beam from its path establishes the maximal radius of the winding.

Figure 6:
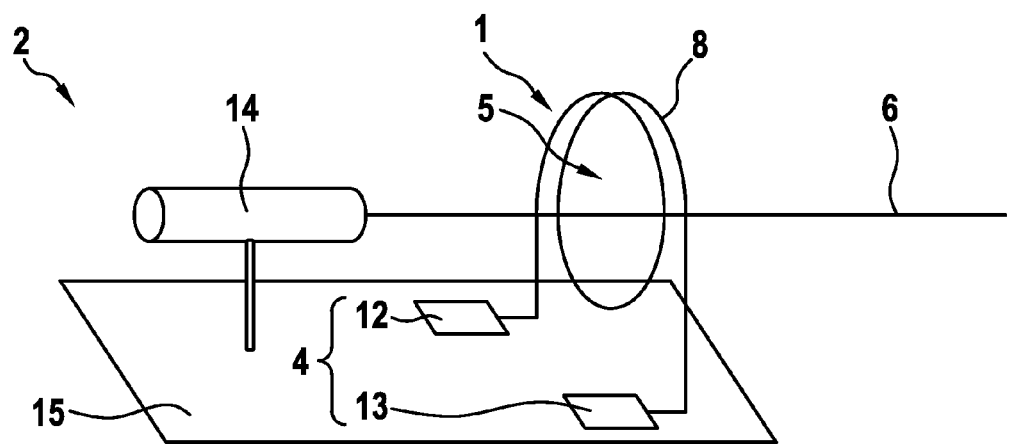
FIG. 6 is a schematic representation of a laser apparatus having a monitoring apparatus according to a third exemplary embodiment of the invention.
Figure 7:
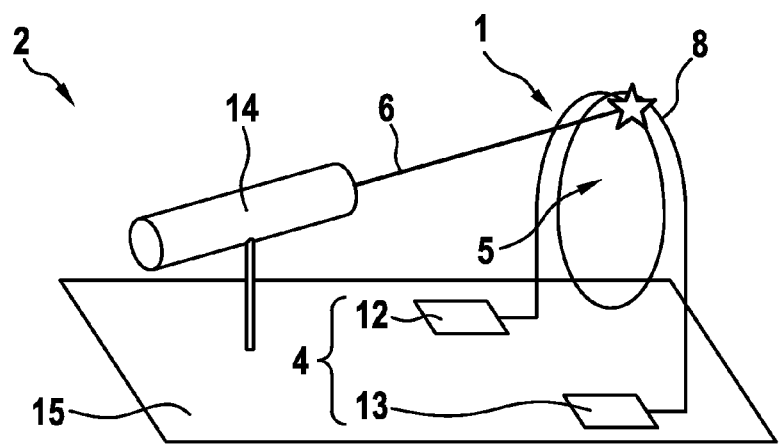
FIG. 7 is a further schematic representation of the laser apparatus having the monitoring apparatus according to the third exemplary embodiment of the invention.

A third exemplary embodiment of the monitoring apparatus 1 according to the invention is shown in FIGS. 6 and 7.

FIG. 6 shows a laser apparatus 2 having a monitoring apparatus 1 according to the third exemplary embodiment of the invention. The laser apparatus 2 comprises not only the monitoring apparatus 1 but also a laser source 14, wherein the laser source 14 and the monitoring apparatus 1 are each mounted on a base plate 15.

The monitoring apparatus 1 comprises a body configured as a light wave guide 8. In this regard, the light wave guide 8 is guided analogous to the electrical conductor 7, in such a manner that the light wave guide 8 forms a winding. This winding thereby defines the passage opening 5 of the light wave guide 8. The sensor 4 comprises a transmission apparatus 12 and a reception apparatus 13, wherein the transmission apparatus 12 is configured for coupling a signal into the light wave guide 8. The reception apparatus 13 is set up for receiving the signal from the light wave guide 8, coupled in by the transmission apparatus 12.

If the light wave guide 8 is damaged by the laser beam 6 because the latter, as shown in FIG. 7, impacts the light wave guide 8, then reception by the reception apparatus 13 of the signal coupled in by the transmission apparatus 12 is no longer possible. Therefore a conclusion must be drawn that the light wave guide 8 has been damaged and therefore the laser beam 6 has impacted the light wave guide 8. Therefore the principle of the third exemplary embodiment follows the principle of the second exemplary embodiment, wherein the light wave guide 8 is used in place of the electrical conductor 7. The light wave guide 8 is particularly formed by a plurality of glass fibers.

The monitoring apparatus 1 according to the third exemplary embodiment advantageously cannot be influenced by external electromagnetic radiation. Likewise, the monitoring apparatus 1 according to the third exemplary embodiment itself does not contaminate the environment with electromagnetic radiation. Because light wave guides generally have a predefined minimal bending radius, it is particularly provided that the light wave guide is guided in spiral shape, so that a circular projection of the light wave guide 8 in a two-dimensional plane is present.

If severing of the electrical conductor 7 or the light wave guide 8 has taken place with the laser beam 6, combustion residues are present. Therefore it is advantageous to clean the laser apparatus 2 before putting it into operation again, in order to eliminate precipitants on optical components such as mirrors or lenses.

REFERENCE SYMBOL LIST

1 monitoring apparatus
2 laser apparatus
3 hollow profile
4 sensor
5 passage opening
6 laser beam
7 electrical conductor
8 light wave guide
9 mantle surface
10 first face surface
11 second face surface
12 transmission apparatus
13 reception apparatus
14 laser source
15 base plate

What is claimed is:

1. A monitoring apparatus for a laser beam, comprising a body having a passage opening and a sensor that is disposed on the body, wherein impact of the laser beam onto the body can be detected using the sensor,
wherein the body is an electrical conductor that is formed into at least one winding, and the sensor is configured for measuring a resistance of the electrical conductor, and
wherein the sensor is adapted to detect whether the conductor is damaged or destroyed by measuring the resistance of the conductor.

2. The monitoring apparatus according to claim 1, wherein the body is a hollow profile having a closed cross-section.

3. The monitoring apparatus according to claim 2, wherein the hollow profile has a lateral surface, wherein the sensor is disposed on the lateral surface.

4. The monitoring apparatus according to claim 2, wherein the hollow profile has a first face surface and a second face surface, wherein the second face surface has a greater roughness than the first face surface.

5. The monitoring apparatus according to claim 3, wherein the hollow profile has a first face surface and a second face surface, wherein the second face surface has a greater roughness than the first face surface.

6. The monitoring apparatus according to claim 2, wherein the hollow profile is produced from an optically conductive material.

7. The monitoring apparatus according to claim 1, wherein the electrical conductor is guided in a circular shape, such that a round passage opening is present.

8. A laser apparatus configured to emit a laser beam, comprising:
a laser source; and
a monitoring apparatus comprising a body having a passage opening and a sensor that is disposed on the body, wherein impact of the laser beam onto the body can be detected using the sensor,
wherein the laser source is configured for emitting the laser beam through the passage openings of the body of the monitoring apparatus, and
wherein the body is an electrical conductor that is formed into at least one winding, and the sensor is configured for measuring a resistance of the electrical conductor, and
wherein the sensor is adapted to detect whether the conductor is damaged or destroyed by measuring the resistance of the conductor.

9. A method for monitoring a laser beam, comprising:
emitting a laser beam from a laser source, through a passage opening of a body of a monitoring apparatus, wherein the body is an electrical conductor that is formed into at least one winding, and
detecting, by a sensor of the monitoring apparatus, after a resistance of said electrical conductor is changed, whether the emitted laser beam has damaged or destroyed the body by measuring the resistance of the conductor.

10. A monitoring apparatus for a laser beam, comprising a body having a passage opening and a sensor that is disposed on the body, wherein impact of the laser beam onto the body can be detected using the sensor,
wherein the body is a hollow profile having a closed cross-section, and
wherein the hollow profile has a lateral surface, wherein the sensor is disposed on the lateral surface.

11. The monitoring apparatus according to claim 10, wherein the hollow profile has a first face surface and a second face surface, wherein the second face surface has a greater roughness than the first face surface.

12. The monitoring apparatus according to claim 10, wherein the hollow profile is produced from an optically conductive material.

13. The monitoring apparatus according to claim 10, wherein the electrical conductor is guided in a circular shape, such that a round passage opening is present.

14. The monitoring apparatus according to claim 10, wherein the body is a light wave guide which is formed into at least one winding, and wherein the sensor is configured for reception of a message transmitted into the light wave guide.

15. A laser apparatus configured to emit a laser beam, comprising:
a laser source; and
a monitoring apparatus comprising a body having a passage opening and a sensor that is disposed on the body, wherein impact of the laser beam onto the body can be detected using the sensor,
wherein the laser source is configured for emitting the laser beam through the passage openings of the body of the monitoring apparatus,
wherein the body is a hollow profile having a closed cross-section, and
wherein the hollow profile has a lateral surface, wherein the sensor is disposed on the lateral surface.

16. A method for monitoring a laser beam, comprising:
emitting a laser beam from a laser source, through a passage opening of a body of a monitoring apparatus, and
recognizing, by a sensor of the monitoring apparatus, that the emitted laser beam has at least one of: been coupled into the body and damaged the body, wherein the body is a hollow profile having a closed cross-section, and wherein the hollow profile has a lateral surface, wherein the sensor is disposed on the lateral surface.

17. A monitoring apparatus for a laser beam, comprising a body having a passage opening and a sensor that is disposed on the body, wherein impact of the laser beam onto the body can be detected using the sensor, wherein the body is a light wave guide which is formed into at least one winding, and wherein the sensor is configured for reception of a message transmitted into the light wave guide, and wherein the sensor is configured for determining if said message is not received or not received correctly.

18. The monitoring apparatus according to claim 17, wherein the body is a hollow profile having a closed cross-section.

19. The monitoring apparatus according to claim 18, wherein the hollow profile has a first face surface and a second face surface, wherein the second face surface has a greater roughness than the first face surface.

20. The monitoring apparatus according to claim 18, wherein the hollow profile is produced from an optically conductive material.

21. A laser apparatus configured to emit a laser beam, comprising:

a laser source; and a monitoring apparatus comprising a body having a passage opening and a sensor that is disposed on the body, wherein impact of the laser beam onto the body can be detected using the sensor, wherein the laser source is configured for emitting the laser beam through the passage openings of the body of the monitoring apparatus, and wherein the body is a light wave guide which is formed into at least one winding, and wherein the sensor is configured for reception of a message transmitted into the light wave guide, and wherein the sensor is configured for determining if said message is not received or not received correctly.

22. A method for monitoring a laser beam, comprising:

emitting a laser beam from a laser source, through a passage opening of a body of a monitoring apparatus, wherein the body is a light wave guide which is formed into at least one winding, and recognizing, by a sensor of the monitoring apparatus being configured for reception of a message transmitted into the light wave guide, that the emitted laser beam has at least one of: been coupled into the body and damaged the body, by determining if said message is not received or not received correctly.

* * * * *